(12) United States Patent
Paik et al.

(10) Patent No.: US 10,300,806 B2
(45) Date of Patent: May 28, 2019

(54) VEHICLE AND METHOD FOR CONTROLLING A BATTERY IN A VEHICLE

(71) Applicant: FORD GLOBAL TECHNOLOGIES, LLC, Dearborn, MI (US)

(72) Inventors: Chi Paik, Brownstown Township, MI (US); Satish B Chikkannanavar, Canton, MI (US); Szushen Ho, Plymouth, MI (US); Edward Vann Decker, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1011 days.

(21) Appl. No.: 14/049,526

(22) Filed: Oct. 9, 2013

(65) Prior Publication Data
US 2015/0097524 A1 Apr. 9, 2015

(51) Int. Cl.
| | | |
|---|---|---|
| *B60L 1/00* | (2006.01) | |
| *B60L 11/18* | (2006.01) | |
| *B60L 58/16* | (2019.01) | |
| *B60L 58/12* | (2019.01) | |
| *B60L 58/22* | (2019.01) | |

(52) U.S. Cl.
CPC ........... *B60L 11/1861* (2013.01); *B60L 58/12* (2019.02); *B60L 58/16* (2019.02); *B60L 58/22* (2019.02); *B60L 2260/22* (2013.01); *Y02T 10/7005* (2013.01); *Y02T 10/7044* (2013.01); *Y02T 10/7061* (2013.01)

(58) Field of Classification Search
CPC ...................................................... B60L 11/18
USPC ....... 320/109, 125, 127, 128, 104; 180/65.1, 180/65.21
See application file for complete search history.

(56) References Cited

U.S. PATENT DOCUMENTS

| | | | |
|---|---|---|---|
| 5,656,915 A | 8/1997 | Eaves | |
| 5,905,360 A * | 5/1999 | Ukita | ........................ B60K 6/28 320/118 |
| 6,841,972 B2 | 1/2005 | Koo | |
| 7,489,106 B1 | 2/2009 | Tikhonov | |
| 8,901,889 B2 * | 12/2014 | Ishibashi | ............... H02J 7/0063 320/118 |

(Continued)

FOREIGN PATENT DOCUMENTS

| | | |
|---|---|---|
| EP | 0607041 A2 | 7/1994 |
| JP | H05211728 A | 8/1993 |
| JP | H0787673 A | 3/1995 |

OTHER PUBLICATIONS

Battery University, "The Secrets of Battery Runtime", Jan. 5, 2012, http://batteryuniversity.com/learn/article/the_secrets_of_battery_runtime.*

(Continued)

*Primary Examiner* — Drew A Dunn
*Assistant Examiner* — Harry O'Neill-Becerril
(74) *Attorney, Agent, or Firm* — David B. Kelley; Brooks Kushman P.C.

(57) ABSTRACT

A vehicle has a control system configured to perform, and a method for controlling a battery in a vehicle includes, the steps of modifying a state of charge of at least some battery cells in the battery, based on: a vehicle idle state, and the battery having at least a predetermined decay rate. The SOC of the at least some battery cells is modified such that the battery has less than the predetermined decay rate after the SOC is modified.

20 Claims, 2 Drawing Sheets

(56) References Cited

U.S. PATENT DOCUMENTS

| | | |
|---|---|---|
| 2009/0015203 A1 | 1/2009 | Oakes |
| 2010/0019729 A1 | 1/2010 | Kaita et al. |
| 2011/0060565 A1 | 3/2011 | Sciarretta et al. |
| 2011/0156652 A1 | 6/2011 | Kishiyama et al. |
| 2011/0226559 A1 | 9/2011 | Chen et al. |
| 2012/0161714 A1 | 6/2012 | Ishibashi |

OTHER PUBLICATIONS

Hande, A. et al., A Selective Boost Equalizer for Series Connected NiMH Battery Packs, ©2004 Institute of Electrical and Electronics Engineers, retrieved from citeseerx.ist.psu.edu dated Aug. 23, 2018.

* cited by examiner

VEHICLE AND METHOD FOR CONTROLLING A BATTERY IN A VEHICLE

TECHNICAL FIELD

The present disclosure relates to a vehicle and a method for controlling a battery in a vehicle.

BACKGROUND

The decay rate of a battery pack can depend on the state of charge (SOC) of the pack when it is in an idle period, particularly in hot climates. For example, the decay rate for a calendar life of a battery can differ by several factors depending on whether the batteries are idled at 0%, 50%, or 100% SOC. In the case where a cell contains mixed cathode materials of lithium nickel cobalt manganese oxide (NCM) and lithium manganese oxide (LMO or spinel), the decay rate has been found to be highest in the SOC regions of 40%-80%. Therefore, a need exists for a vehicle and a method for controlling a battery in a vehicle that modifies a battery SOC when it is determined that the battery is not immediately needed—e.g., when the vehicle is in a key-off state for a prolonged time—and it is further determined that the battery SOC is in a range that indicates a high decay rate.

SUMMARY

At least some embodiments of the present disclosure include a method for controlling a battery in a vehicle, including the steps of modifying a state of charge of at least some battery cells in the battery, based on: a vehicle idle state, and the battery having at least a predetermined decay rate. The SOC of the at least some battery cells is modified such that the battery has less than the predetermined decay rate after the SOC is modified. As used herein, a "vehicle idle state" does not refer to the vehicle "idling"—i.e., running while stopped—rather, it refers to the vehicle being in a key-off state—i.e., not operating.

At least some embodiments of the present disclosure include a method for controlling a battery in a vehicle, including the steps of modifying a state of charge (SOC) of at least some battery cells in the battery based on: a predetermined event, and the battery having at least a predetermined decay rate. The SOC of the at least some battery cells is modified such that the battery has less than the predetermined decay rate after the SOC is modified.

At least some embodiments of the present disclosure include a vehicle having a battery including a plurality of battery cells and a control system having at least one controller configured to modify an SOC of at least some of the battery cells based on a predetermined event and the battery having at least a predetermined decay rate. The control system is configured to modify the SOC such that the battery has less than the predetermined decay rate after the SOC of the at least some of the battery cells is modified.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
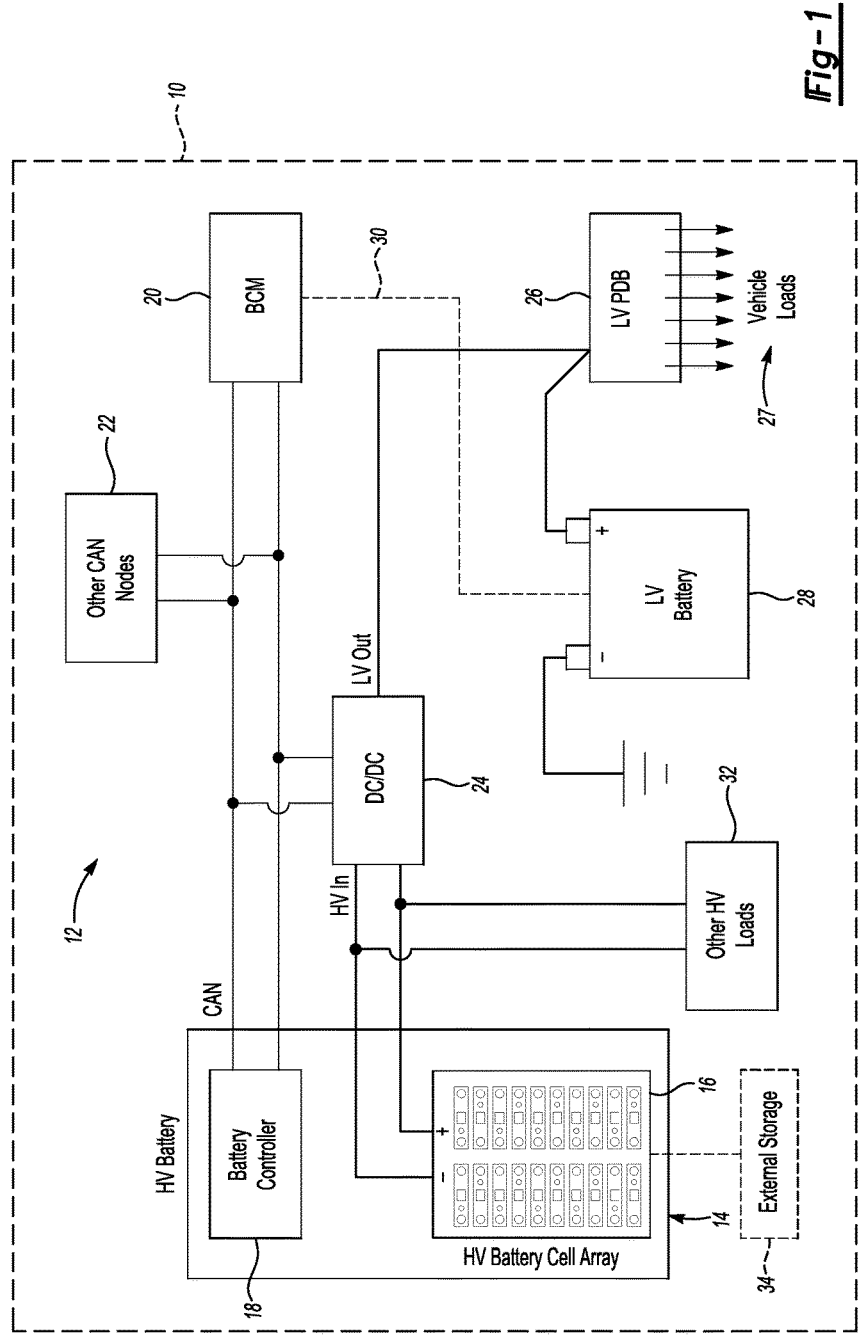
FIG. 1 shows a schematic representation of a vehicle in accordance with embodiments of the present disclosure.

FIG. 1 shows a vehicle 10 in accordance with embodiments of the present disclosure. The vehicle 10 includes an electrical system 12 having a high-voltage power source 14, which, in this embodiment, is a high-voltage battery. The battery 14 includes a high-voltage battery cell array 16 and a battery controller 18. The battery controller 18 is connected via a controller area network (CAN) to other controllers, some or all of which make up a control system. As shown in FIG. 1, the control system includes a body control module (BCM) 20. In addition to communicating with the battery 14, the BCM 20 communicates with other controllers and systems throughout the vehicle 12 as represented schematically by the "Other CAN Nodes" 22. The BCM 20 also communicates with a DC/DC converter 24, which is configured to receive a high-voltage input from the high-voltage battery 14. The converter 24 outputs low-voltage power, which is routed to a low-voltage power distribution box, or fuse box 26. Low-voltage vehicle loads 27 and a low-voltage battery 28 are connected to the fuse box 26. The low-voltage battery 28 can supply power to the fuse box, and the low-voltage loads 27, if required.

A dashed line 30 is shown connecting the low-voltage battery 28 to the BCM 20, and represents a communication between them. In addition to supplying a low-voltage power to the low-voltage loads 27 through the converter 24, the high-voltage battery 14 also provides high-voltage power to high-voltage loads 32, which may be, for example, a traction motor in an electric or hybrid electric vehicle. Also shown in FIG. 1 is an optional external storage device 34, which could be, for example, a supercapacitor, another battery, or other electrical storage device. The external storage 34, as explained in detail below, may be utilized in some embodiments of the present disclosure to provide a mechanism by which the SOC of the battery 14 can be increased or decreased as desired.

In accordance with embodiments of the present disclosure, the control system of the vehicle 10, and in particular the battery controller 18, may be configured to perform a number of steps to help increase the life of a high-voltage battery pack 16. In general, the battery controller 18 can be configured to modify the SOC of at least some of the cells in the battery pack 16 based on a predetermined event and the battery having at least a predetermined decay rate. For example, the predetermined event may be related to the vehicle being idle—i.e., the vehicle being off—for more than a predetermined time. This could be communicated to the battery controller 18, for example, through a driver initiated signal, which could be initiated by the driver via a dashboard or console switch, or a button on a smart key fob. Such a signal may be received, for example, by a controller in the vehicle control system, and communicated to the battery controller 18 via the other CAN nodes 22 shown in FIG. 1. Thus, when a vehicle operator knows that the vehicle will be idle for an extended period of time, for example, 24 hours or more, the predetermined event could include the operator actuating the switch to provide this information to the battery controller 18.

Alternatively, vehicle systems can be monitored, and when the vehicle 10 has been idle for a predetermined amount of time, this information can be communicated directly with the battery controller 18 by one of the other systems in the control system, such as another controller or a GPS receiver. In such a case, the "predetermined event" includes the vehicle being idle for more than the predetermined time, which, as in the example above, may be 24 hours, although other time periods can be used. In fact, the predetermined time may be a calibratable parameter, which could be changed over the course of the life of a battery. It is worth noting that automatically monitoring the vehicle systems is not mutually exclusive with a signal being directed from a vehicle operator; rather, the two options may both be available. In this way, if the vehicle operator knows that the vehicle will be idle—i.e., in a key-off state—for extended period, he or she can alert the control system by providing a signal related to vehicle idle time as described above; however, when the vehicle remains idle for at least the predetermined time, and the signal has not been provided by the vehicle operator, the signal can be sent to the battery controller 18 based on the automatic monitoring.

As described above, the decision to modify the battery SOC can be based on a predetermined event, such as the vehicle remaining idle for a predetermined time, and also based on the battery having at least a predetermined decay rate. The decay rate of the battery, such as the battery pack 16 shown in FIG. 1, may be based on a number of factors, including the SOC of the battery and a knowledge of the constituent materials making up the battery. For example, for a battery containing mixed cathode materials of lithium nickel cobalt manganese oxide (NCM) and lithium manganese oxide (LMO or spinel), the decay rate may be unacceptably high when the SOC is 40%-80%. Batteries containing other constituent materials may have high decay rates at different SOC levels. Moreover, the age of the battery may also be taken under consideration when determining whether the decay rate is at a level where implementing the present invention is desirable. Therefore, although the decay rate may be referred to as a "determined" parameter, in practice, it will likely be estimated based on known information, such as the battery SOC, the constituent materials making up the battery, and a general knowledge of battery behavior under various conditions.

As described above, if the predetermined event has occurred and the battery has—e.g., is estimated to have—at least a predetermined rate of decay, a control system configured in accordance with embodiments of the present disclosure can modify the battery SOC to reduce the decay rate so that it is below the unacceptably high level indicated by the predetermined decay rate. Modifying the SOC can be done in any number of ways, depending on the configuration of the electrical control system and the various systems and devices available therein. For example, FIG. 1 shows an external storage device 34 in communication with the high-voltage battery 14. The external storage device 34 may be, for example, a supercapacitor, capable of receiving or providing electrical charge from and to the battery 14. Therefore, in at least some embodiments, the control system may be configured to discharge the entire battery pack 16 to the external storage device 34 so SOC of the battery 14 is below the level where the unacceptably high decay rate would be present. Alternatively, the control system may be configured to charge the entire battery pack 16 to raise the SOC above the level or the unacceptably high decay rate would be present.

Although an external storage device, such as the external storage 34 shown in FIG. 1, provides a convenient mechanism for charging and discharging the battery 14, the addition of such a device adds cost and weight to a vehicle. Therefore, control systems in accordance with embodiments of the present disclosure can be configured to transfer charge to and from various cells within the battery pack 16. Specifically, the control system may increase the SOC of some of the battery cells in the battery pack 16 by charging them from the other cells in the battery pack 16, thereby reducing the SOC of these other cells, and unbalancing the SOC in the battery pack 16. Because the high decay rate for at least some batteries is most prevalent when the battery is idle, the control system can be configured to rebalance the SOC of the battery cells once the vehicle has returned to operation and the battery is again being charged and discharged pursuant to normal operation. Whether the SOC is modified by charging from or charging to an external storage device, or whether it is modified by unbalancing the SOC as described above, the battery will have a decay rate less than the predetermined decay rate after the SOC is modified.

Some battery control systems, especially in the case of high-voltage batteries used in an electric or hybrid electric vehicle, may have automatic self-discharge mechanisms designed to ensure that individual battery cells are not overcharged. In such a case, if a battery remains idle for an extended period of time after the SOC has been modified—either through unbalancing or increasing the overall SOC—the control system can be configured to periodically monitor the open circuit voltage (OCV) of the battery to ensure that cells having a high SOC have not automatically discharged, which could bring these cells back into the SOC range indicating a high decay rate. In at least some embodiments, the cells would be monitored every 72 hours to determine if their SOC has changed such that they are now back in the range where a high decay rate would be expected. If this has occurred, the control system may automatically return to the step of modifying the SOC so as to take the battery cells out of the high decay rate range.

Figure 2:
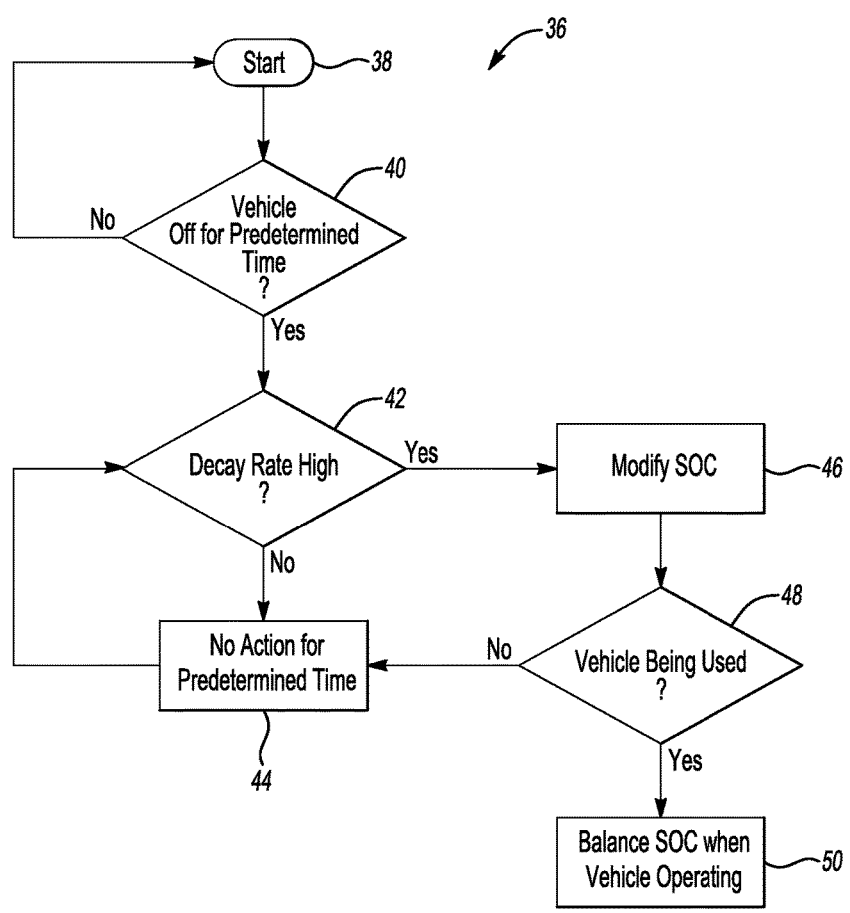
FIG. 2 shows a flowchart illustrating a method in accordance with embodiments of the present disclosure.

FIG. 2 shows a flowchart 36 illustrating a method in accordance with embodiments of the disclosure, and in particular, illustrating the steps that may be programmed into and performed by a control system as described above. The method starts at step 38, and then a determination is made at step 40 as to the vehicle idle state, specifically, whether the vehicle is off for a predetermined time. As noted above, this may come through an automatic monitoring of vehicle systems, for example by a GPS receiver communicating with a controller, such as the battery controller 18. Alternatively, a signal can be sent directly by a vehicle operator who plans on the vehicle being off for the predetermined time. If the answer at decision block 40 is "No", the method loops back to the start. If, however, the answer at decision block 40 is "Yes", the method continues to decision block 42 where it is determined whether the battery is in a range that indicates a high rate of decay. As described above, this may be determined through a combination of a knowledge of the battery constituent materials and a monitored SOC for the battery cells.

If it is determined at decision block 42 that the battery is not in a range that indicates a high rate of decay, no action will be taken for a predetermined time—this is illustrated at step 44. Thus, for example, a control system may be configured to monitor the battery for indications that it is in a range where a high decay rate would be expected, and it may perform this monitoring at some predetermined frequency, which was 72 hours in the example provided above, although the frequency could be less or greater than this as desired. The battery will continue to be monitored at step 44, always returning to decision block 42 to determine if the battery has yet reached a state where a high decay rate is expected. When it is determined that the battery has reached such a state, the method moves to step 46 where the SOC is modified as described above.

It is next determined at decision block 48 whether the vehicle is being used, which may be the engine being on and the vehicle moving, or in other embodiments may be just the engine being on. If the vehicle is not being used, the method loops back to the periodic monitoring shown at step 44. Once it is determined at decision block 48 that the vehicle is being used, the SOC of the battery cells is rebalanced while the vehicle is operating—this is shown at step 50. For embodiments utilizing an external storage device, such as the external storage device 34 shown in FIG. 1, rather than rebalancing, additional charge can be provided to or taken from the battery pack 16, based on the operating conditions at that time.

While exemplary embodiments are described above, it is not intended that these embodiments describe all possible forms of the invention. Rather, the words used in the specification are words of description rather than limitation, and it is understood that various changes may be made without departing from the spirit and scope of the disclosure. Additionally, the features of various implementing embodiments may be combined to form further embodiments of the invention.

What is claimed is:

1. A method for controlling a battery in a vehicle, comprising:
    modifying a state of charge (SOC) of at least some battery cells in the battery based on a vehicle idle state and the battery having at least a predetermined decay rate, the SOC of the at least some battery cells being modified such that the battery has less than the predetermined decay rate after the SOC is modified.

2. The method of claim 1, wherein the vehicle idle state is indicated by a driver initiated signal.

3. The method of claim 1, wherein the vehicle idle state is indicated by the vehicle being idle for more than a predetermined time.

4. The method of claim 1, wherein modifying the SOC of the at least some battery cells includes unbalancing the SOC of the battery by increasing the SOC of some of the battery cells and decreasing the SOC of some other of the battery cells.

5. The method of claim 4, further comprising balancing the SOC of the battery when the vehicle is operated after the vehicle has been idle and the SOC of the battery has been unbalanced.

6. The method of claim 1, wherein the battery includes a plurality of constituent materials, and the predetermined decay rate is based on at least the SOC of the battery and at least one of the constituent materials.

7. A method for controlling a battery in a vehicle, comprising:
    modifying a state of charge (SOC) of at least some battery cells in the battery based on a predetermined event and the battery having at least a predetermined decay rate, the SOC of the at least some battery cells being modified such that the battery has less than the predetermined decay rate after the SOC is modified.

8. The method of claim 7, wherein the predetermined event is a driver initiated signal indicating that the vehicle will be idle for more than a predetermined time.

9. The method of claim 7, wherein the predetermined event is the vehicle being idle for more than a predetermined time.

10. The method of claim 7, wherein modifying the SOC of the at least some battery cells includes unbalancing the SOC of the battery by increasing the SOC of some of the battery cells and decreasing the SOC of some other of the battery cells.

11. The method of claim 10, wherein the predetermined event is related to the vehicle being idle for more than a predetermined time, the method further comprising balancing the SOC of the battery when the vehicle is operated after the SOC of the battery has been unbalanced.

12. The method of claim 7, wherein the battery includes a plurality of constituent materials, and the predetermined decay rate is based on at least the SOC of the battery and at least one of the constituent materials.

13. The method of claim 7, wherein modifying the SOC of the at least some battery cells includes one of increasing the SOC of the battery or decreasing the SOC of the battery.

14. A vehicle having a battery including a plurality of battery cells, comprising:
    a control system having at least one controller configured to modify an SOC of at least some of the battery cells based on a predetermined event and the battery having at least a predetermined decay rate, such that the battery has less than the predetermined decay rate after the SOC of the at least some of the battery cells is modified.

15. The vehicle of claim 14, wherein the control system is configured to modify the SOC of the at least some of the battery cells by increasing the SOC of some of the battery cells and decreasing the SOC of some other of the battery cells, thereby unbalancing the SOC of the battery.

16. The vehicle of claim 15, wherein the predetermined event is related to the vehicle being idle for more than a predetermined time, the control system being further configured to balance the SOC of the battery when the vehicle is operated after the SOC of the battery has been unbalanced.

17. The vehicle of claim 14, wherein the control system is further configured to receive a driver initiated signal, the predetermined event being the driver initiated signal indicating that the vehicle will be idle for more than a predetermined time.

18. The vehicle of claim 14, wherein the control system is further configured to receive a signal related to vehicle idle time, and wherein the predetermined event is the vehicle being idle for more than a predetermined time.

19. The vehicle of claim 14, wherein the battery includes a plurality of constituent materials, and the predetermined decay rate is based on at least the SOC of the battery and at least one of the constituent materials.

20. The vehicle of claim 14, further comprising an electrical storage device separate from the battery, and wherein the control system is configured to modify the SOC of the at least some of the battery cells by performing one of: decreasing the SOC of the battery by transferring charge from the battery to the electrical storage device, or increasing the SOC of the battery by transferring charge from the electrical storage device to the battery.

* * * * *